United States Patent [19]

Ha et al.

[11] Patent Number: 5,645,719

[45] Date of Patent: Jul. 8, 1997

[54] FILTER CLAMPING DEVICE FOR WATER PURIFIERS

[75] Inventors: Dong-Kyu Ha, Suwon; Duk-Hee Lee, Inchon, both of Rep. of Korea

[73] Assignee: Samsung Electronics Co., Ltd., Suwon, Rep. of Korea

[21] Appl. No.: 688,028

[22] Filed: Jul. 29, 1996

[30] Foreign Application Priority Data

Jul. 29, 1995 [KR] Rep. of Korea .................. 95-23145

[51] Int. Cl.⁶ ........................ B01D 21/08; B01D 27/14
[52] U.S. Cl. ................ 210/232; 210/282; 210/323.1; 210/455; 248/313; 248/690
[58] Field of Search ........................ 210/264, 282, 210/323.1, 416.3, 455, 232, 238; 248/682, 689, 690, 691, 692, 693, 311.2, 313; 222/180

[56] References Cited

U.S. PATENT DOCUMENTS

| | | | |
|---|---|---|---|
| 4,298,469 | 11/1981 | LeBlanc et al. | 210/238 |
| 4,517,082 | 5/1985 | Prudhomme | 210/238 |
| 4,997,561 | 3/1991 | Schutz | 210/232 |
| 5,098,054 | 3/1992 | Dyer | 248/313 |
| 5,188,727 | 2/1993 | Kurth et al. | 210/282 |
| 5,249,702 | 10/1993 | Topp et al. | 248/690 |
| 5,320,752 | 6/1994 | Clack et al. | 210/282 |

*Primary Examiner*—W. L. Walker
*Attorney, Agent, or Firm*—Burns, Doane, Swecker & Mathis, L.L.P.

[57] ABSTRACT

A water purifier includes a casing and water filters disposed inside of the casing. The filters are mounted in vertically spaced brackets that are fixed within the casing. Each bracket includes a snap ring in which a respective filter is elastically clamped. Each filter includes vertically spaced hooks, each hook engaged in a hole of a respective snap ring and engaging a top surface of the respective snap ring. Each filter including vertically spaced ribs engageable with bottom sides of respective snap rings. The hooks and ribs preventing the filters from moving vertically relative to the brackets.

5 Claims, 3 Drawing Sheets

FILTER CLAMPING DEVICE FOR WATER PURIFIERS

BACKGROUND OF THE INVENTION

1. Field of the Invention

The present invention relates, in general, to a filter clamping device for water purifiers.

Description of the Conventional Art

2. In a typical water purifier used for providing pure potable water, tap water such as city water passes through a filtering means so that various harmful materials are removed from tap water. The typical water purifiers have been generally classified into several types, that is, natural-filtering type water purifiers, serial-filtering type water purifiers, ion exchange resin type water purifiers and reverse osmotic type water purifiers.

In a typical reverse osmotic water purifier, tap water is pressurized and passes through a synthetic osmotic membrane thereby being purified. The above synthetic osmotic membrane filters off various heavy metals, bacteria and cancer-causing materials from the tap water but exclusively allows pure water with dissolved oxygen to pass therethrough. The reverse osmotic water purifiers have been typically used in updated science industries, the medical field and high precision electronic industries. The reverse osmotic water purifying technique also has been actively used with domestic or business water purifiers recently, due to water contamination.

FIGS. 1 and 2 show the construction of a typical water purifier. As shown in the drawings, a filter unit 4 comprising a series of filters is installed inside the casing 1 of the water purifier. The filters of the unit 4 are connected to a water supply pipe 3 in series. The pipe 3 extends from a tap 2 so that the filters of the unit 4 remove various harmful materials from tap water such as city water, which is supplied from the tap 2 through the pipe 3, thus purifying the water. A purified water tank 5 is placed over and connected to the filter unit 4. The above tank 5 contains the purified water discharged from the filter unit 4. The water purifier also includes two additional water tanks, that is, hot water tank 7 and cold water tank 8 which are placed under the purified water tank 5. The hot and cold water tanks 7 and 8 are connected to the purified water tank 5 through respective pipes 6. The purified water of the tank 5 is discharged into the hot water tank 7 thus being heated to an appropriate hot temperature prior to being served to users. Meanwhile, the cold water tank 8 cools the purified water discharged thereto from the tank 5. Provided in the hot water tank 7 is a heater 9, which heats purified water inside the tank 7. Meanwhile, a cooling coil 10 is wound about the cold water tank 8 and performs a water cooling operation by its refrigerating cycle in order to cool the water inside the tank 8. A water distributing pipe 12 extends from the top of each of the hot and cold water tanks 7 and 8 to the outside of the front panel 11 of the casing 1. Two taps, that is, hot and cold water taps 13 are mounted to the exposed ends of the distributing pipes 12, respectively. The taps 13 dispense hot and cold purified water from the tanks 7 and 8, respectively. The filters of the above filter unit 4 are elastically and detachably held by a filter clamping device so that the filters are vertically arranged inside the casing 1. In the typical water purifier, the filter clamping device comprises two brackets, that is, upper and lower brackets 16. Each bracket 16 has a mount board, which is screwed to the rear surface of a vertical wall 14 by means of a plurality of set screws 15. The wall 14 is vertically oriented centrally inside the casing 1.

As best seen in FIG. 3, each bracket 16 has a plurality of snap rings which are arranged on the mount board of the bracket 16. The snap rings are spaced apart at regular intervals and elastically clamp the respective filters of the unit 4. Each snap ring is connected to the bracket 16 through a connection rib. The snap rings of each bracket 16 have different sizes, since the cylindrical filters of the unit 4 have different outer diameters. Each snap ring has an elastic ring body 16b with a fitting mouth 16a. The above fitting mount 16a allows each filter to be snapped into the elastic ring body 16b. The snap rings, connection ribs and mount board of each bracket 16 are preferably cast into a single structure.

In operation of the above water purifier, the tap water is supplied from the tap 2 to the filter unit 4 through the pipe 3. Various harmful materials such as heavy metals, bacteria and cancer-causing materials from the tap water are removed from the tap water while the water passes through the filter unit 4. The tap water is thus purified. The purified water is primarily contained in the tank 5 and in turn is discharged to the hot and cold water tanks 7 and 8. The purified water in the hot water tank 7 is heated to an appropriate hot temperature by the heater 9, while the water in the cold water tank 8 is cooled to an appropriate low temperature by the water cooling coil 10.

When the taps 13 are opened by a user, hot and cold purified water of the tanks 7 and 8 flows to the taps 13 through the pipes 12 and in turn is served to the user. In this case, each tap 13 may be opened by, for example, pressing the lever (not shown) of the tap 13 using a cup.

In the above water purifier, the typical filter clamping device has the snap fitting construction which elastically clamps the filters only by the snap rings of the brackets 16. However, the above snap fitting construction of the typical filter clamping device fail to tightly clamp the filters and thereby may permit a vertical movement of the filters relative to the brackets 16 when an impact is applied to the filters. Consequently, the filters of the unit 4 may be suddenly disassembled and/or be deformed, thus reducing the operational reliability of the water purifier.

In addition, the above filter clamping device may permit the filters to be easily separated from the brackets by an impact when the water purifier carelessly falls over backward while the water purifier is handled, e.g. for maintenance. Various elements, arranged about the filter unit inside the casing, may be thus damaged or broken by the separated filters. Therefore, the operational reliability of the water purifier is further reduced.

SUMMARY OF THE INVENTION

It is, therefore, an object of the present invention to provide a structurally-improved filter clamping device for water purifiers in which the above problems can be overcome and which almost completely prevents a vertical movement of the filters relative to the brackets even when an impact is applied to the filters, thus causing neither a disassembly nor a deformation of the filters.

It is another object of the present invention to provide a filter clamping device for water purifiers which is less likely to cause a separation of the filters from the clamping device by an impact even when the water purifier carelessly falls over backward while the water purifier is handled for circulation or maintenance, and which does not cause a damage or breaking of the elements arranged about the filter unit inside the water purifier's casing.

In order to accomplish the above objects, a filter clamping device for a water purifier in accordance with the preferred embodiment of the present invention comprises two brackets mounted to a vertical wall inside a water purifier's casing. Each bracket is provided with a plurality of snap rings for elastically clamping respective filters. A hook is provided on the outer wall of each filter. The hook engages with the top surface of an associated snap ring of the bracket thus preventing a downward movement of each filter relative to the bracket. A stop rib is provided on the outer surface of each filter at a position downwardly spaced apart from the hook by a predetermined distance. The stop rib engages with the bottom surface of an associated snap ring of the bracket thus preventing an upward movement of each filter relative to the bracket.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 2:
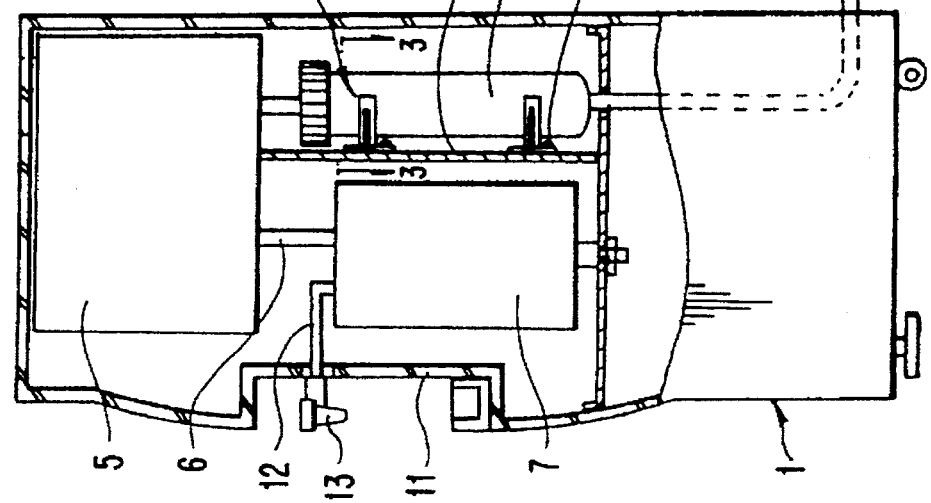
FIG. 2 is a sectional side view showing the construction of the FIG. 1 water purifier with a typical filter clamping device.
Figure 1:
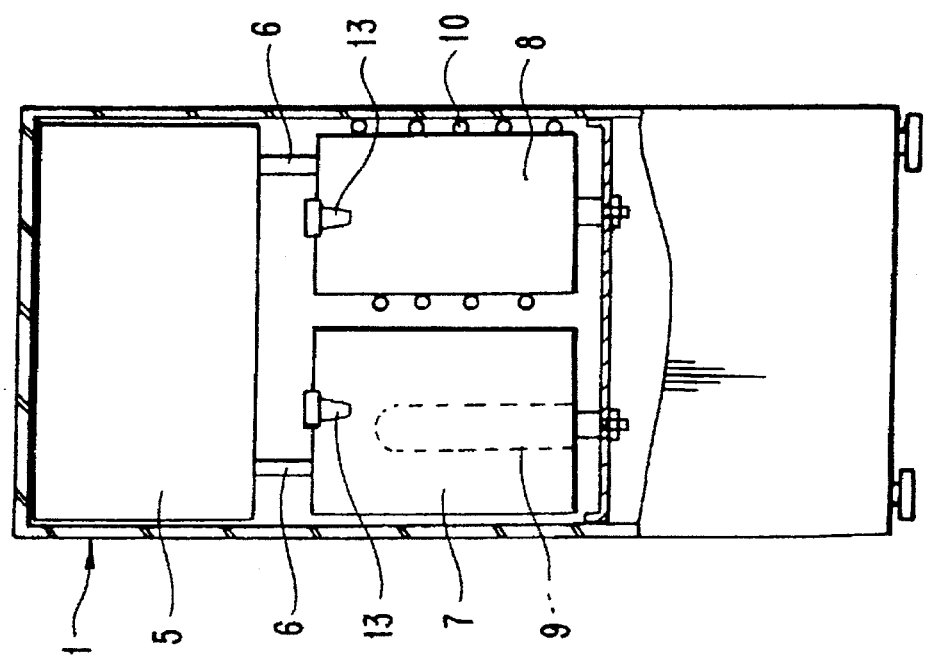
FIG. 1 is a partially sectioned front view of a conventional water purifier.
Figure 3:
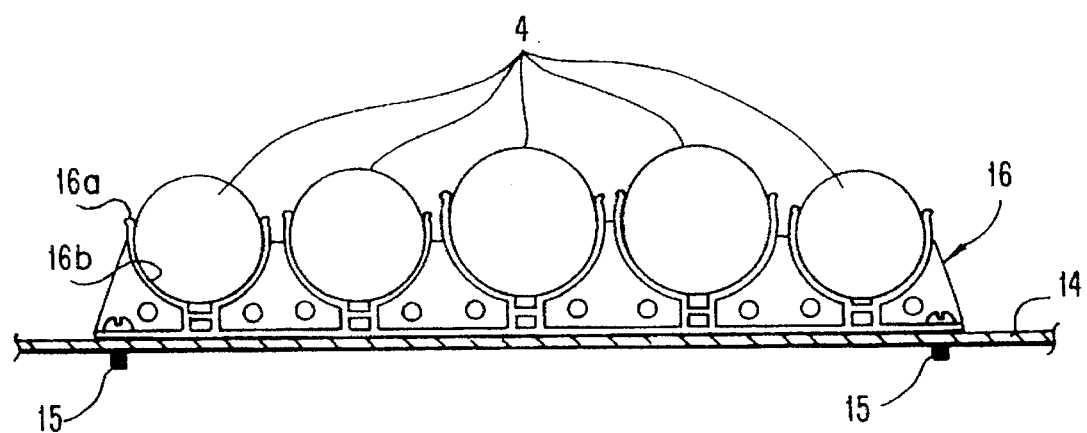
FIG. 3 is a horizontal sectional view taken along the line 3—3 of FIG. 2, showing the construction in the prior art filter clamping device.
Figure 4:
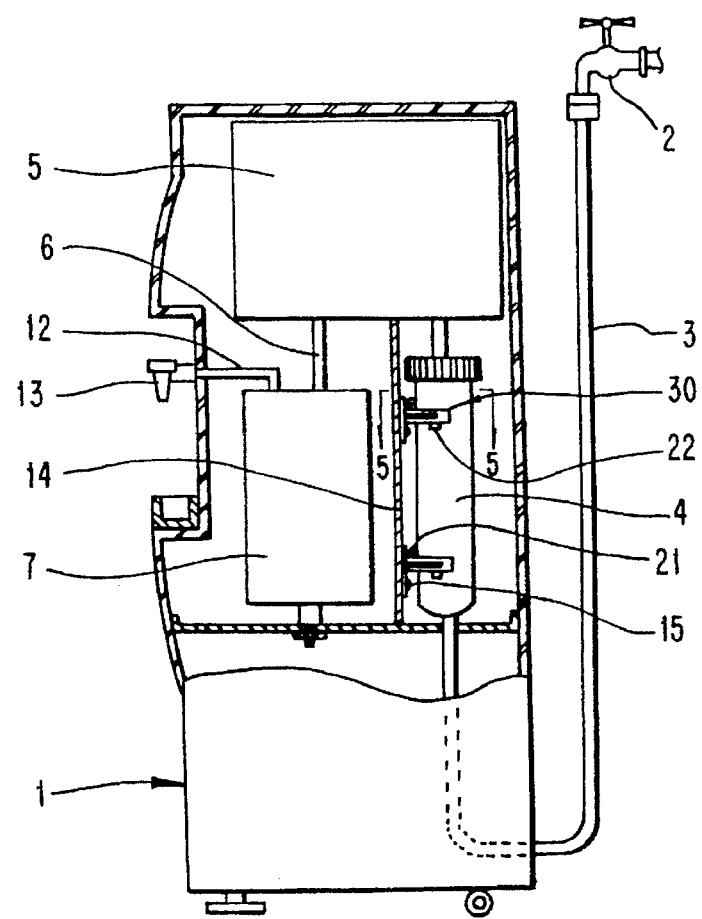
FIG. 4 is a sectional side view showing the construction of a water purifier with a filter clamping device in accordance with the preferred embodiment of the present invention.
Figure 5:
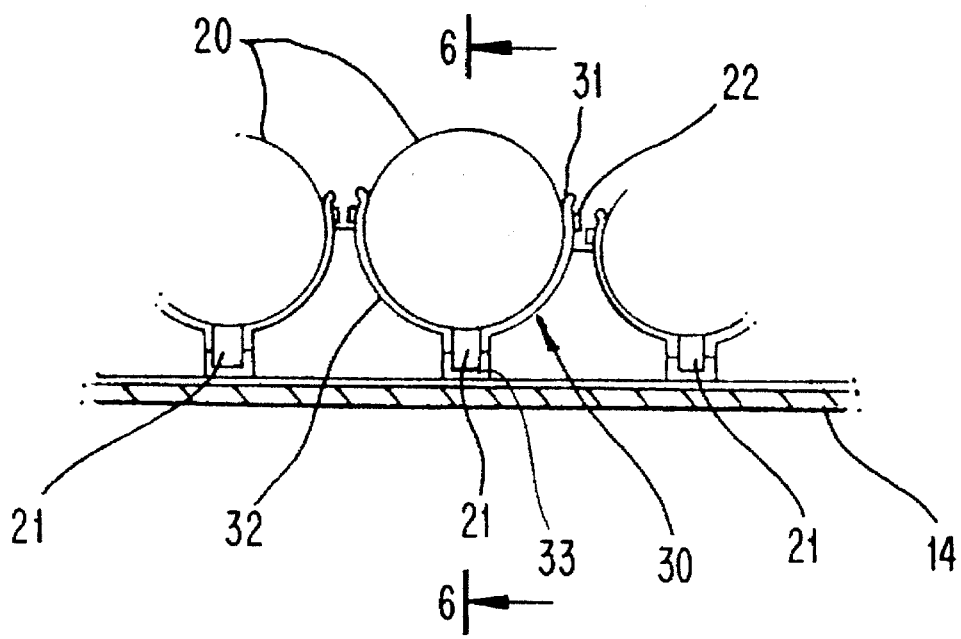
FIG. 5 is a horizontal sectional view taken along the line 5—5 of FIG. 4, showing the construction of the filter clamping device of this invention.
Figure 6:
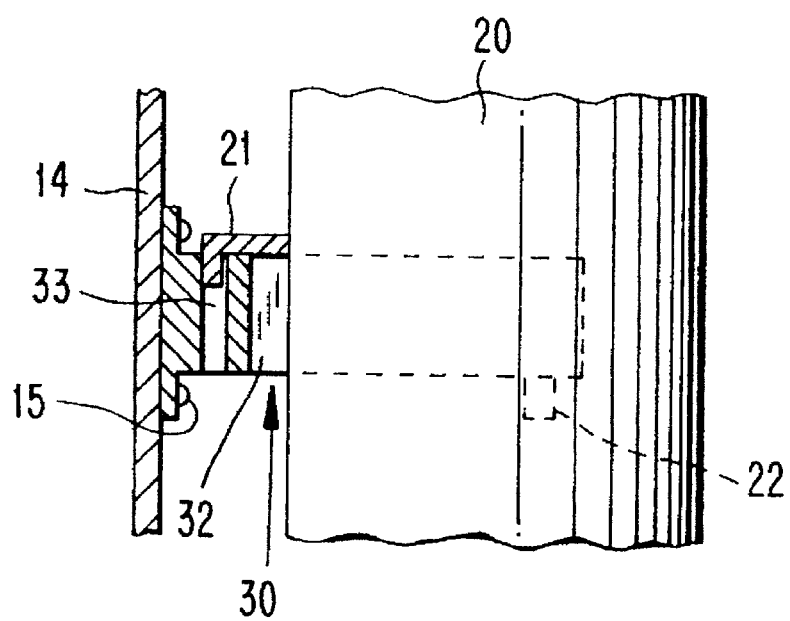
FIG. 6 is a sectional view taken along the line 6—6 in FIG. 5.

In FIGS. 4 and 5, the elements common to both the typical embodiment of FIGS. 1 to 3 and the present embodiment will carry the same reference numerals and further explanation is thus not deemed necessary.

In FIGS. 4 and 5, the filter clamping device of this invention comprises two brackets, that is, upper and lower brackets 30. Each bracket 30 has a mount board which is screwed to the rear surface of a vertical wall 14 by means of a plurality of set screws 15. The vertical wall 14 is vertically oriented centrally inside the casing 1. Each bracket 30 has a plurality of snap rings, which are connected to the mount board through respective connection ribs and elastically clamp the respective filters of the filter unit 20. Two hooks 21 are provided on the outer surface of each cylindrical filter. The hooks 21 of each filter are vertically spaced apart from each other by a distance equal to the gap between the upper and lower snap rings. Each of the hooks 21 defines an abutment which the top surfaces of one of the snap rings of a respective one of the brackets 30. The hooks 21 thus prevent a separation or downward movement of the filter clamped by the brackets 30 even when an impact is applied to the filter. Each filter further comprises stop ribs 22, which are provided on the outer surface of the filter at positions under the hooks 21. The ribs 22 are vertically spaced apart from the hooks 21 by a predetermined distance, respectively. The stop ribs 22 define lower abutments which engage with the bottom surfaces of the upper and lower snap rings, respectively, thus preventing an upward movement of the filter relative to the brackets 30.

Each hook 21 has a reversed L-shaped configuration so that the hook 21 detachably engages with the snap ring of the bracket 30.

As shown in FIG. 4, the stop ribs 22 may be provided on at least one side of each filter. The gap between a hook 21 and an associated stop rib 22 is equal to the thickness of the snap ring. As described above, the position of the hook 21 is slightly higher than the position of the stop rib 22.

On each bracket 30, a plurality of snap rings are arranged on the mount board of the bracket 30 at regular intervals and elastically clamp the respective filters of the unit 20. Each snap ring is connected to an associated bracket 30 through a connection rib and has an elastic ring body 32 with a fitting mouth 31. The fitting mouth 31 allows each filter to be snapped into a respective elastic ring body 32 of the snap ring. The snap rings, connection ribs and mount board of each bracket 30 are preferably cast into a single structure. The top surface of the connection rib is provided with a recess 33 for engaging with the hook 21 of an associated filter.

The operational effect of the above filter clamping device will be described hereinbelow.

In order to clamp the filters of the unit 20 in respective places inside the water purifier's casing, the filters are forcibly snapped into the snap rings of the upper and lower brackets 30. When the filters are snapped into the snap rings of the brackets 30, the ring bodies 32 are elastically opened prior to completely receiving the filters. In this case, a part of each filter, for example, ⅔ of the outer surface of each filter is snapped into the ring body 32. After the filters are snapped into the ring bodies 32, the ring bodies 32 elastically return to their original configurations. The filters are thus stably and tightly clamped by the snap rings and are spaced out at regular intervals.

While the filters are snapped into the snap rings of the brackets 30, the hook 21 and stop rib 22 engage with the top and bottom of the snap ring, respectively. In addition, the reverse L-shaped hook 21 includes a downwardly projecting portion is caught by the recess 33 of the connection rib of the bracket 30. In this regard, the filters of the unit 20 are restrained against vertical movement relative to the brackets even when an impact is applied to the filters. The filters are not thus disassembled or deformed. Another advantage of the filter clamping device resides in that the filters are not separated from the brackets even when the water purifier falls over backward while the water purifier is handled.

As described above, the present invention provide a structurally-improved filter clamping device for water purifiers. In accordance with the filter clamping device of this invention, the filters are snapped into the snap rings of the upper and lower brackets. In addition, each filter has a hook and a stop rib which engage with the top and bottom surfaces of the snap ring of the bracket. The filters are thus neither disassembled nor deformed even when an impact is applied to the filters.

The above filter clamping device also tightly clamps the filters so that the filters are not separated from the brackets even when the water purifier falls over backward while the water purifier is handled.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A water purifier comprising:

a casing:

a bracket disposed inside the casing and mounted to a vertical wall, the bracket including a plurality of snap rings each having an open mouth; and a plurality of filters elastically clamped within respective ones of the snap rings, each filter including upper and lower abutments, the upper abutment being engageable with a top surface of a respective snap ring, and the lower abutment engageable with a bottom surface of the respective snap ring, the upper and lower abutments preventing vertical movement of the filter relative to the bracket.

2. The water purifier according to claim 1 wherein the upper abutment is formed by a hook carried by each filter, the hook including a downwardly projecting portion received in a recess of the bracket.

3. The water purifier according to claim 2 wherein there are two said brackets disposed in the casing, the brackets being vertically spaced, each bracket including snap rings, the snap rings of an upper one of the brackets being clamped to upper portions of the filters, the snap rings of a lower one of the brackets being clamped to lower portions of the filters, there being two said hooks carried by each filter and engaged in holes formed by both of the brackets.

4. The water purifier according to claim 1 wherein each filter is cylindrical.

5. The water purifier according to claim 3 wherein there are two said lower abutments carried by each filter, each of the lower abutments being engageable with a respective one of the upper and lower brackets.

* * * * *